(12) United States Patent
Takemoto et al.

(10) Patent No.: US 7,304,768 B2
(45) Date of Patent: Dec. 4, 2007

(54) IMAGE PROCESSING APPARATUS, COMPUTER READABLE MEDIUM STORING PROGRAM, IMAGE PROCESSING METHOD, METHOD FOR PRODUCING DYNAMIC IMAGE AND PRINTER

(75) Inventors: Fumito Takemoto, Kanagawa (JP); Haruto Hirose, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 1048 days.

(21) Appl. No.: 10/396,373

(22) Filed: Mar. 26, 2003

(65) Prior Publication Data
US 2003/0184826 A1   Oct. 2, 2003

(30) Foreign Application Priority Data
Mar. 29, 2002   (JP)   ............................. 2002-096665

(51) Int. Cl.
  G06K 9/00   (2006.01)
  G03F 3/08   (2006.01)
  G03G 15/00  (2006.01)
  H04N 5/00   (2006.01)
(52) U.S. Cl. ................. 358/1.9; 358/519; 399/160; 386/45; 386/120; 382/162; 382/167
(58) Field of Classification Search ............... 358/1.9, 358/519; 345/589–590, 156, 592, 618, 762, 345/87–89, 204; 386/46, 95, 120; 348/700, 348/415.1, 416.1, 239, 553, 586; 382/294, 382/217, 162, 167; 399/160
See application file for complete search history.

(56) References Cited

U.S. PATENT DOCUMENTS

| | | | |
|---|---|---|---|
| 4,920,423 A * | 4/1990 | Shiota | ........................ 386/46 |
| 5,614,960 A * | 3/1997 | Chiba et al. | ................. 348/700 |
| 5,710,617 A | 1/1998 | Inuiya | |
| 6,078,726 A | 6/2000 | Gotoh et al. | |
| 6,160,581 A | 12/2000 | Higashihara et al. | |
| 6,335,735 B1 * | 1/2002 | Denda et al. | ................ 345/589 |
| 6,571,054 B1 * | 5/2003 | Tonomura et al. | ............. 386/95 |
| 6,850,214 B2 * | 2/2005 | Nishitani et al. | .............. 345/87 |
| 6,987,535 B1 * | 1/2006 | Matsugu et al. | ............. 348/239 |
| 7,006,708 B1 * | 2/2006 | Nako et al. | .................. 382/294 |
| 2002/0048389 A1 | 4/2002 | Komaki | |
| 2002/0063736 A1 * | 5/2002 | Sugimoto | .................... 345/762 |
| 2002/0080276 A1 * | 6/2002 | Mori et al. | .................. 348/553 |
| 2002/0140652 A1 * | 10/2002 | Suzuki et al. | .................. 345/87 |

FOREIGN PATENT DOCUMENTS

JP   2002-77723 A   3/2002

* cited by examiner

Primary Examiner—Kimberly Williams
Assistant Examiner—Charlotte M. Baker
(74) Attorney, Agent, or Firm—Birch, Stewart, Kolasch & Birch, LLP

(57) ABSTRACT

An image processing apparatus which performs correction processing on a dynamic image including a plurality of frame images for determining the correction value suitable for each of the frame images of the dynamic image including: a detector detecting change of scenes of the dynamic image; a correction value determination unit determining the correction value for image processing of each of the plurality of frame images based on the change of the scenes detected by the detector; and a correction unit correcting each of the frame images of the dynamic image based on the correction value determined by the correction value determination unit.

51 Claims, 9 Drawing Sheets

IMAGE PROCESSING APPARATUS, COMPUTER READABLE MEDIUM STORING PROGRAM, IMAGE PROCESSING METHOD, METHOD FOR PRODUCING DYNAMIC IMAGE AND PRINTER

This patent application claims priority from a Japanese patent application No. 2002-096665 filed on Mar. 29, 2002, the contents of which are incorporated herein by reference.

BACKGROUND OF THE INVENTION

1. Field of the Invention

The present invention relates to an image processing apparatus, a computer readable medium storing program, an image processing method, a method for producing a dynamic image, and a printer. More particularly, the present invention relates to an image processing apparatus, a computer readable medium storing program, an image processing method, a method for producing a dynamic image, and a printer for performing correction processing on the dynamic image including a plurality of frame images.

2. Description of Related Art

Conventionally, an image processing on a dynamic image, such as a gamma correction, has had to be done manually by a user.

Since frame images of the dynamic image are different from each other, it is difficult for a user to set parameters for each of the frame images properly.

SUMMARY OF THE INVENTION

Therefore, it is an object of the present invention to provide an image processing apparatus, a computer readable medium storing program, an image processing method, a method for producing a dynamic image, and a printer which can solve the foregoing problems. The above and other objects can be achieved by combinations described in the independent claims. The dependent claims define further advantageous and exemplary combinations of the present invention.

According to the first aspect of the present invention, there is provided an image processing apparatus for performing correction processing on a dynamic image including a plurality of frame images. The image processing apparatus includes: a correction value determination unit determining the correction value for image processing on each of the frame images; and a correction unit correcting each of the frame images of the dynamic image based on the correction value determined by the correction value determination unit.

The correction value determination unit may determine correction value for each of the plurality of frame images respectively, and the correction unit may correct each of the frame images based on the correction values determined by the correction value determination unit.

The correction value determination unit may determine the correction values of frame images every predetermined number of frames among the plurality of frame images, and the correction unit may correct each of the frame images based on the correction values determined by the correction value determination unit.

The correction value determination unit may determine the correction values of frame images every predetermined interval among the plurality of frame images, and may determine the correction values of frame images, which are sandwiched between the two frame images on which the correction values are determined by the correction value determination unit, based on the correction value of the two frame images.

The correction value determination unit may determine the correction values of frame images every predetermined number of seconds among the plurality of frame images, and may determine the correction values of frame images, which are sandwiched between the two frame images on which the correction values are determined by the correction value determination unit, based on the correction value of the two frame images.

The correction value determination unit may determine the correction values of frame images every predetermined number of frames among the plurality of frame images, and may determine the correction values of frame images, which are sandwiched between the two frame images on which the correction values are determined by the correction value determination unit, based on the correction value of the two frame images.

The correction value determination unit may determine the correction values of frame images which are sandwiched between the two frame images on which the correction values are determined by the correction value determination unit, by interpolating between the two frame images.

The image processing apparatus may further include a detection unit detecting change of scenes of the dynamic image, and the correction value determination unit may determine the correction value of a frame image immediately after the change of the scenes and another frame image after a predetermined interval from the frame image, and may determine the correction values of frame images, which are sandwiched between the two frame images on which the correction values are determined by the correction value determination unit, based on the correction value of the two frame images.

The image processing apparatus may further include a detection unit detecting change of scenes of the dynamic image, and the correction value determination unit may determine a correction value for each of the scenes based on the change of the scenes detected by the detection unit.

If difference of a first color component, a second color component or a third color component between the frame image and another frame image immediately before the frame image is larger than a predetermined value, the detection unit may judge that the scenes are changed between the two frame images.

The color components may be a C (cyan) component, an M (magenta) component, and a Y (yellow) component. Moreover, the color components may be hue, color saturation, and lightness. Moreover, the color components may be an R (red) component, a G (green) component, and a B (blue) component.

The dynamic image is an image of a subject captured by the image capturing apparatus, and if the difference of distance from the subject of the frame image to the image capturing apparatus between the frame image and a frame image immediately before the frame image is larger than a predetermined value, the detection unit may judge that the scenes are changed between the two frame images.

The image processing apparatus may further include an incidental information acquisition unit acquiring incidental information about each of the frame images, and the correction value determination unit may determine the correction value based on the incidental information acquired by the incidental information acquisition unit.

The incidental information acquisition unit may acquire photography time of each of the frame images as the incidental information. The incidental information acquisition unit may acquire photography location of each of the frame images as the incidental information.

The dynamic image is an image of a subject captured by the image capturing apparatus, and the incidental information acquisition unit may acquire information indicating distance from the subject of each of the frame images to the image capturing apparatus as the incidental information.

The dynamic image is an image of a subject captured by the image capturing apparatus, and the incidental information acquisition unit may acquire information indicating brightness of each of the frame images as the incidental information.

The dynamic image further includes sound information, and the image processing apparatus may further include: a sound information acquisition unit acquiring the sound information; and a sound information analysis unit analyzing sound source of the sound information, and the correction value determination unit may determine the correction value based on the information indicating the sound source analyzed by the sound information analysis unit.

The correction value determination unit may determine the correction value for white balance correction of each of the frame images, and the correction unit may perform white balance correction on each of the frame images of the dynamic image based on the correction value.

The correction value determination unit may determine the correction value for gamma correction of each of the frame images, and the correction unit may perform gamma correction on each of the frame images of the dynamic image based on the correction value. The correction value determination unit may determine the correction value for brightness correction of each of the frame images, and the correction unit may perform brightness correction on each of the frame images of the dynamic image based on the correction value.

The correction value determination unit may determine the correction value for edge enhancement correction for each of the frame images, and the correction unit may perform edge enhancement correction on each of the frame images of the dynamic image based on the correction value.

According to the second aspect of the present invention, there is provided a computer readable medium storing thereon a program for performing correction processing on a dynamic image. The program includes: a correction value determination module causing computer to determine the correction value for image processing on each of the frame images; and a correction module causing computer to correct each of the frame images of the dynamic image based on the determined correction value.

The correction value determination module may cause computer to determine correction value for each of the plurality of frame images respectively, and the correction module may cause computer to correct each of the frame images based on the correction values caused to determine by the correction value determination module.

The correction value determination module may cause computer to determine the correction values of frame images every predetermined number of frames among the plurality of frame images, and the correction module may cause computer to correct each of the frame images based on the correction values caused to determine by the correction value determination module.

The correction value determination module may cause computer to determine the correction values of frame images every predetermined interval among the plurality of frame images, and may cause computer to determine the correction values of frame images, which are sandwiched between the two frame images on which the correction values are caused to determine by the correction value determination module, based on the correction value of the two frame images.

The correction value determination module may cause computer to determine the correction values of frame images every predetermined number of seconds among the plurality of frame images, and may cause computer to determine the correction values of frame images, which are sandwiched between the two frame images on which the correction values are caused to determine by the correction value determination module, based on the correction value of the two frame images.

The correction value determination module may cause computer to determine the correction values of frame images every predetermined number of frames among the plurality of frame images, and may cause computer to determine the correction values of frame images, which are sandwiched between the two frame images on which the correction values are caused to determine by the correction value determination module, based on the correction value of the two frame images.

The correction value determination module may cause computer to determine the correction values of frame images which are sandwiched between the two frame images on which the correction values are caused to determine by the correction value determination module, by interpolating between the two frame images.

The computer readable medium storing thereon a program may further include a detection module causing computer to detect change of scenes of the dynamic image, and the correction value determination module may cause computer to determine the correction value of a frame image immediately after the change of the scenes and another frame image after a predetermined interval from the frame image, and may cause computer to determine the correction values of frame images, which are sandwiched between the two frame images on which the correction values are caused to determine by the correction value determination module, based on the correction value of the two frame images.

The computer readable medium storing thereon a program may further include a detection module causing computer to detect change of scenes of the dynamic image, and the correction value determination module may cause computer to determine a correction value for each of the scenes based on the change of the scenes caused to detect by the detection module.

If difference of a first color component, a second color component or a third color component between the frame image and another frame image immediately before the frame image is larger than a predetermined value, the detection module may cause computer to judge that the scenes are changed between the two frame images.

The color components may be a C (cyan) component, an M (magenta) component, and a Y (yellow) component. Moreover, the color components may be hue, color saturation, and lightness. Moreover, the color components may be an R (red) component, a G (green) component, and a B (blue) component.

The dynamic image is an image of a subject captured by an image capturing apparatus, and if the difference of distance from the subject of the frame image to the image capturing apparatus between the frame image and a frame image immediately before the frame image is larger than a predetermined value, the detection module may cause computer to judge that the scenes are changed between the two frame images.

The computer readable medium storing thereon a program may further include an incidental information acquisition module causing computer to acquire incidental information about each of the frame images, and the correction value determination module may cause computer to determine the correction value based on the incidental information caused to acquire by the incidental information acquisition module.

The incidental information acquisition module may cause computer to acquire photography time of each of the frame images as the incidental information.

The incidental information acquisition module may cause computer to acquire photography location of each of the frame images as the incidental information.

The dynamic image is an image of a subject captured by the image capturing apparatus, and the incidental information acquisition module may cause computer to acquire information indicating distance from the subject of each of the frame images to the image capturing apparatus as the incidental information.

The dynamic image is an image of a subject captured by the image capturing apparatus, and the incidental information acquisition module may cause computer to acquire information indicating brightness of each of the frame images as the incidental information.

The dynamic image further includes sound information, and the computer readable medium storing thereon a program may further include: a sound information acquisition module causing computer to acquire the sound information; and a sound information analysis module causing computer to analyze sound source of the sound information, and the correction value determination module may cause computer to determine the correction value based on the information indicating the sound source caused to analyze by the sound information analysis module.

The correction value determination module may cause computer to determine the correction value for white balance correction of each of the frame images, and the correction module may cause computer to perform white balance correction on each of the frame images of the dynamic image based on the correction value.

The correction value determination module may cause computer to determine the correction value for gamma correction of each of the frame images, and the correction module may cause computer to perform gamma correction on each of the frame images of the dynamic image based on the correction value.

The correction value determination module may cause computer to determine the correction value for brightness correction of each of the frame images, and the correction module may cause computer to perform brightness correction on each of the frame images of the dynamic image based on the correction value.

The correction value determination module may cause computer to determine the correction value for edge enhancement correction for each of the frame images, and the correction module may cause computer to perform edge enhancement correction on each of the frame images of the dynamic image based on the correction value.

According to the third aspect of the present invention, there is provided an image processing method for performing correction processing on a dynamic image including a plurality of frame images. The image processing method includes steps of: determining the correction value for image processing on each of the frame images; and correcting each of the frame images of the dynamic image based on the determined correction value.

According to the fourth aspect of the present invention, there is provided a method for producing a dynamic image including a plurality of frame images. The method for producing a dynamic image includes steps of: acquiring a dynamic image; determining a correction value of each of the frame images included in the acquired dynamic image; and correcting each of the frame images included in the dynamic image based on the determined correction value.

According to the fifth aspect of the present invention, there is provided a printer for printing a frame image included in a dynamic image. The printer includes: an image acquisition unit acquiring the frame image; a receiving unit receiving information about a correction value of the frame image from an image processing apparatus determining the correction value used for image processing of the dynamic image; a correction value calculating unit calculating information about a correction value used by the printer based on information about the correction value received by the receiving unit; and a correction unit correcting the frame image based on information about the correction value calculated by the correction value calculating unit.

The summary of the invention does not necessarily describe all necessary features of the present invention. The present invention may also be a sub-combination of the features described above.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention. A term "printer" used in this specification represents a term "printer" in the claims of the present invention. Moreover, terms "correction value conversion table generating unit" used in this specification represent terms "correction value calculating unit" in the claim of the present invention.

Figure 1:
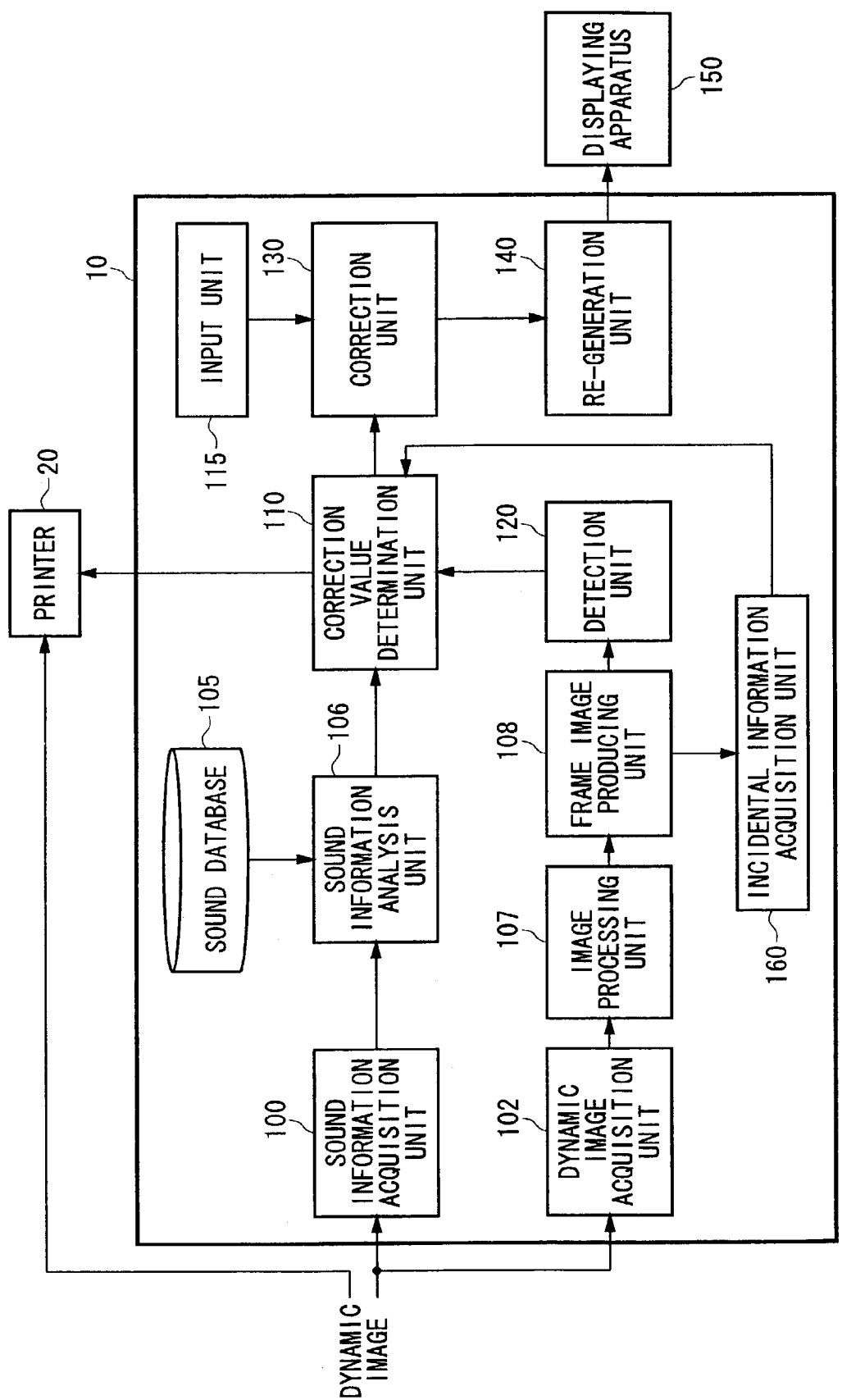
FIG. 1 is a block diagram indicating a functional configuration of an image processing apparatus according to an embodiment of the present invention.

FIG. 1 is a block diagram showing a functional configuration of an image processing apparatus 10 according to an embodiment of the present invention. The image processing apparatus 10 performs correction processing on each of the frame images of a dynamic image including a plurality of frame images. The image processing apparatus 10 transmits the dynamic image, on which the correction processing is performed, to a displaying apparatus 150. The displaying apparatus 150 displays the dynamic image received from the image processing apparatus 10. Moreover, the image processing apparatus 10 transmits information about the correction of the dynamic image to a printer 20. The printer 20 performs correction on the dynamic image based on the information about the correction received from the image processing apparatus 10, and prints the dynamic image.

The image processing apparatus 10 includes a sound information acquisition unit 100, a dynamic image acquisition unit 102, a sound database 105, a sound information analysis unit 106, an image processing unit 107, a frame image producing unit 108, a correction value determination unit 110, an input unit 115, a detection unit 120, a correction unit 130, a re-generation unit 140, and an incidental information acquisition unit 160. The sound database 105 stores correction information for each of the sound data.

The dynamic image acquisition unit 102 acquires a dynamic image including a plurality of frame images, and transmits it to the image processing unit 107. The image processing unit 107 performs interlace correction and image quality improvement processing on the received dynamic image. The interlace correction is a correction which computes and compensates pixel value between scanning lines of the dynamic image when a television system is in interlace mode. The image quality improvement processing is a processing which compensates image quality degradation due to such as compression of the image. The image processing unit 107 transmits the dynamic image, on which the interlace correction and the image quality improvement processing are performed, to the frame image producing unit 108. The frame image producing unit 108 divides the received dynamic image into a plurality of frame images. Moreover, the frame image producing unit 108 converts data format of a frame image from RGB data into standardized CMY data (density value). Next, the frame image producing unit 108 transmits the divided frame image to the detection unit 120. Moreover, the frame image producing unit 108 transmits incidental information, which is the information relevant to the corresponding frame image and is to be attached to the frame image, to the incidental information acquisition unit 160. The incidental information acquisition unit 160 transmits the incidental information received from the frame image producing unit 108 to the correction value determination unit 110.

The sound information acquisition unit 100 acquires the sound information of the dynamic image with synchronous information which synchronizes the sound information with the corresponding frame image, and transmits them to the sound information analysis unit 106. Specifically, the sound information analysis unit 106 analyzes a sound source included in the sound information. The sound information analysis unit 106 analyzes the sound information and judges whether the sound information includes the same or similar sound source as/to that of sound data stored in the sound database 105. Here, the sound data stored in the sound database 105 is sounds, such as human voice, or sound of ripples or a little stream of a brook. Here, human voice is used as an example of the present embodiment. If the sound information includes the same or similar sound source as/to that of the sound data stored in the sound database 105, the sound information analysis unit 106 extracts correction information corresponding to the sound data from the sound database 105. Moreover, the sound information analysis unit 106 transmits voice information and correction information to the correction value determination unit 110 with the synchronous information, where the voice information indicates that the sound information includes the same or similar sound source as/to that of the sound data stored in the sound database 105.

The detection unit 120 analyzes the frame image received from the frame image producing unit 108, and detects the change of scenes in the dynamic image. The detection unit 120 attaches scene change identification information to the frame image immediately after the detected change of the scenes so as to identify the frame image immediately after the change of the detected scenes. Next, the detection unit 120 transmits the frame images, to which the scene change identification information is attached, and frame images received from the frame image producing unit 108, to which the scene change identification information are not attached, to the correction value determination unit 110.

The correction value determination unit 110 determines a correction value of each of the frame images based on the frame image received from the detection unit 120, the voice information, the correction information and the synchronous information received from the sound information analysis unit 106, and the incidental information received from the incidental information acquisition unit 160. Next, the correction value determination unit 110 transmits the determined correction value to the correction unit 130 with the frame image received from the detection unit 120. Moreover, the correction value determination unit 110 transmits the determined correction value to the printer 20.

The correction unit 130 corrects each of the frame images received from the correction value determination unit 110 based on the correction value received from the correction value determination unit 110. Moreover, the correction unit 130 converts the data format of the frame image from the CMY data into the standard RGB data, which is common to various equipments. The correction unit 130 transmits the corrected frame image to the re-generation unit 140.

The re-generation unit 140 combines the frame images received from the correction unit 130 with the sound information received from the sound information acquisition unit 100, and re-generates the dynamic image. Furthermore, the re-generation unit 140 performs noise reduction of the sound information of the re-generated dynamic image. Next, the re-generation unit 140 transmits the re-generated dynamic image to the displaying apparatus 150. The displaying apparatus 150 displays the dynamic image received from the re-generation unit 140. The input unit 115 accepts an input from a user about the correction on the dynamic image displayed by the displaying apparatus 150. The correction unit 130 corrects the dynamic image based on the input.

Figure 2:
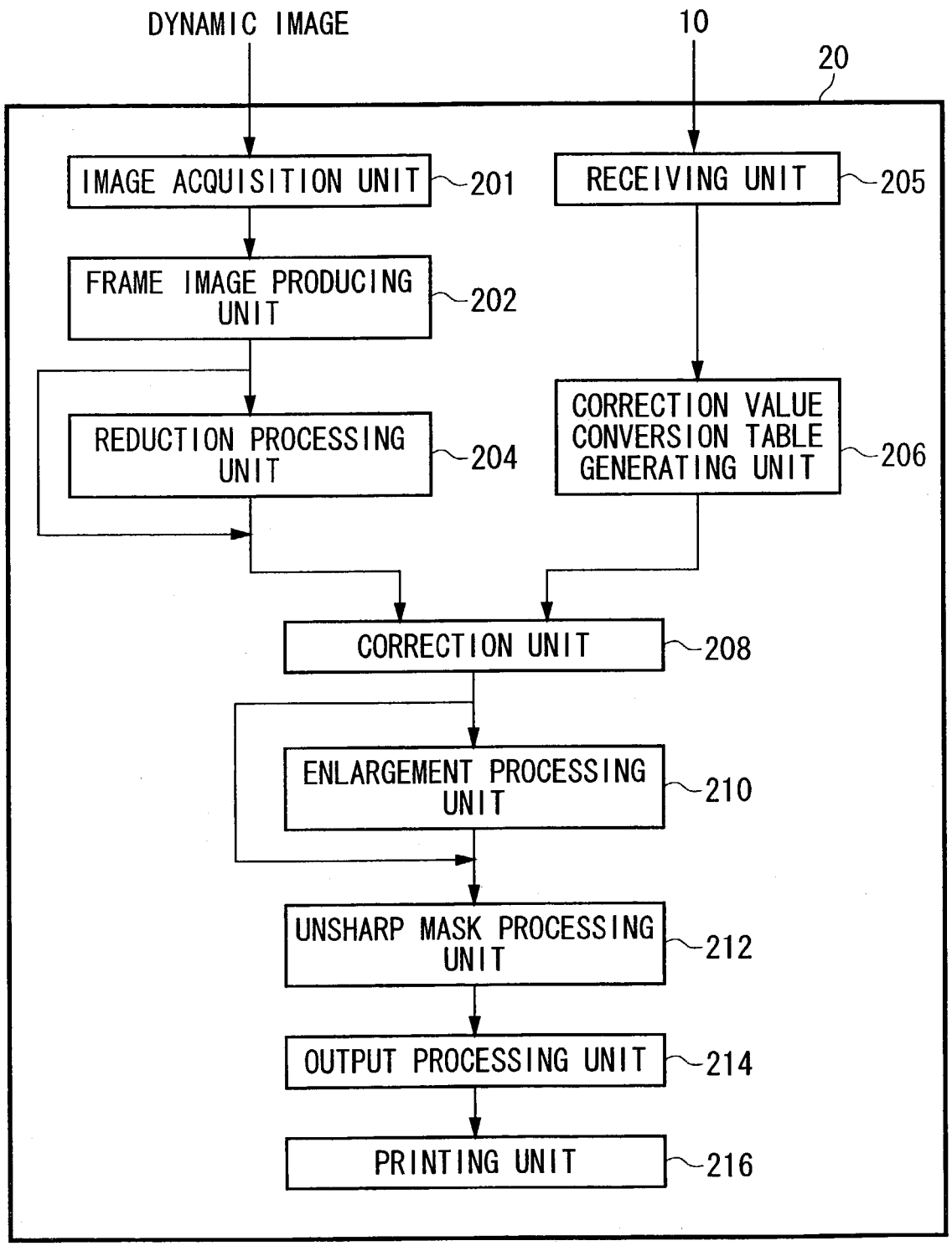
FIG. 2 is a block diagram exemplary showing a functional configuration of a printer.

FIG. 2 is a block diagram exemplary showing a functional configuration of the printer 20. The printer 20 includes an image acquisition unit 201, a frame image producing unit 202, a reduction processing unit 204, a receiving unit 205, a correction value conversion table generating unit 206, a correction unit 208, an enlargement processing unit 210, an unsharp mask processing unit 212, an output processing unit 214, and a printing unit 216.

The image acquisition unit 201 acquires the dynamic image which includes a plurality of frame images, and transmits it to the frame image producing unit 202. The frame image producing unit 202 divides the received dynamic image into a plurality of frame images. The frame image producing unit 202 transmits each of the divided frame images to the reduction processing unit 204. If a size of the received frame image is larger than a size suitable for the printer 20, the reduction processing unit 204 reduces the size of the frame image, and transmits it to the correction unit 208. If the size of the received frame image is the same as or smaller than the size suitable for the printer 20, the reduction processing unit 204 transmits the frame image to the correction unit 208 without the size reduction.

The receiving unit 205 receives the correction value from the correction value determination unit 110 of the image processing apparatus 10, and transmits it to the correction value conversion table generating unit 206. The correction value conversion table generating unit 206 composes a color look-up table based on the received correction value. The color look-up table stores values corresponding to R (red), G (green), and B (blue). The correction value conversion table generating unit 206 transmits the composed color look-up table to the correction unit 208.

The correction unit 208 corrects the frame image received from the reduction processing unit 204 based on the color look-up table received from the correction value conversion table generating unit 206. Moreover, the correction unit 208 converts the data format of the frame image received from the reduction processing unit 204 from the RGB data into the standard RGB data, which is the data format common to various equipments. The correction unit 208 transmits the corrected frame image to the enlargement processing unit 210. If the size of received frame image is smaller than the size suitable for the printer 20, the enlargement processing unit 210 enlarges the frame image and transmits it to the unsharp mask processing unit 212, and if the size is enough large, it transmits the frame image to the unsharp mask processing unit 212 without the enlargement. The unsharp mask processing unit 212 performs unsharp mask processing on the received frame image, and transmits it to the output processing unit 214. The output processing unit 214 converts the frame image of standard RGB data into data format inherent in the printer 20, and transmits it to the printing unit 216. The printing unit 216 prints the received frame image.

As for the printer 20 according to the present embodiment, while the image acquisition unit 201 acquires the dynamic image, the receiving unit 205 alternatively receives the frame image from the image processing apparatus 10 according to another embodiment.

Figure 3:
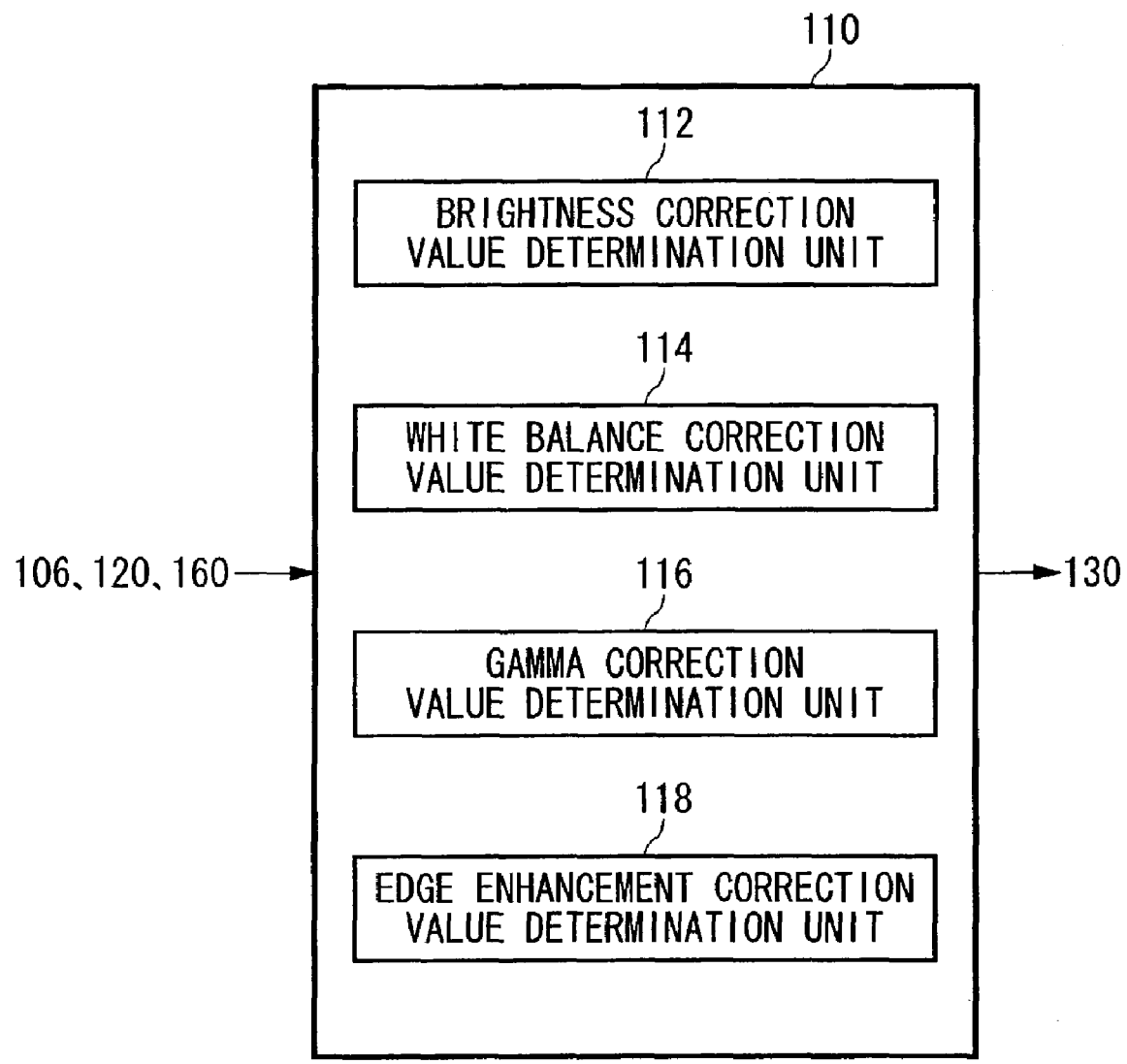
FIG. 3 is a block diagram showing a detailed functional configuration of a correction value determination unit.

FIG. 3 is a block diagram showing the detailed functional configuration of the correction value determination unit 110. The correction value determination unit 110 includes a brightness correction value determination unit 112, a white balance correction value determination unit 114, a gamma correction value determination unit 116, and an edge enhancement correction value determination unit 118.

The brightness correction value determination unit 112 determines the correction value of brightness of each of the frame images. The white balance correction value determination unit 114 determines the correction value of a white balance of each of the frame images. The gamma correction value determination unit 116 determines the correction value of a gamma correction of each of the frame images. The edge enhancement correction value determination unit 118 determines the correction value of edge enhancement of each of the frame images.

Figure 4:
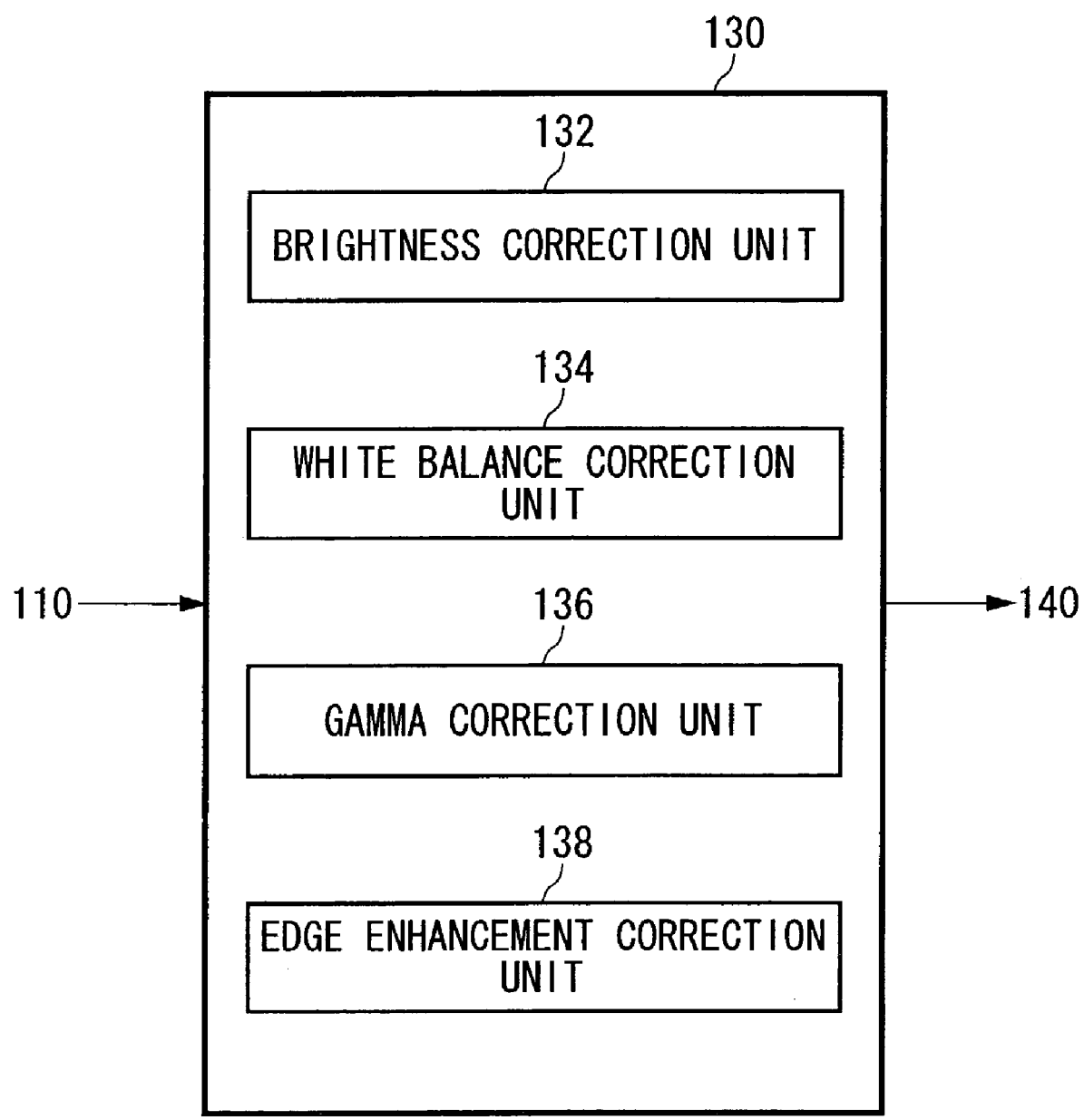
FIG. 4 is a block diagram showing a detailed functional configuration of a correction unit.

FIG. 4 is a block diagram showing a detailed functional configuration of the correction unit 130. The correction unit 130 includes a brightness correction unit 132, a white balance correction unit 134, a gamma correction unit 136, and an edge enhancement correction unit 138.

The brightness correction unit 132 corrects the brightness on the frame image based on the correction value determined by the brightness correction value determination unit 112. The white balance correction unit 134 corrects the white balance on the frame image based on the correction value determined by the white balance correction value determination unit 114. The gamma correction unit 136 performs the gamma correction on the frame image based on the correction value determined by the gamma correction value determination unit 116. The edge enhancement correction unit 138 corrects edge enhancement on the frame image based on the correction value determined by the edge enhancement correction value determination unit 118.

Figure 5:
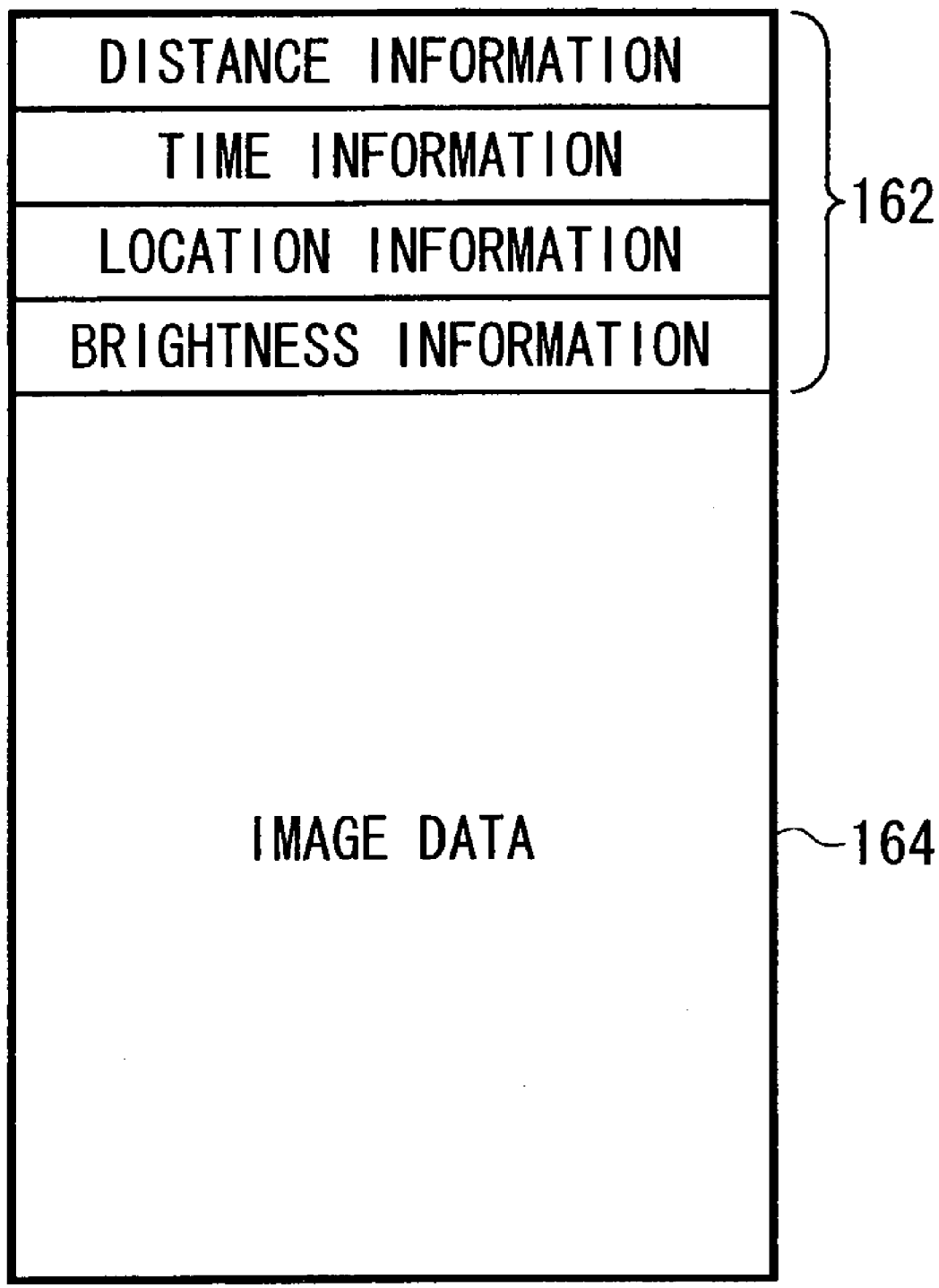
FIG. 5 is an example of a data format of a frame image produced by a frame image producing unit.

FIG. 5 is an example of the data format of the frame image produced by the frame image producing unit 108. The frame image includes the incidental information 162 and the image data 164. Here, the frame image is an image of a subject captured by the image capturing apparatus. The incidental information 162 includes distance information which indicates a distance from the image capturing apparatus to the subject, time information which indicates a time when the image is photographed, location information which indicates a location where the image is photographed, and brightness information which indicates brightness of the subject. The image data 164 is data of the image.

The correction value determination unit 110 determines the correction value based on at least information among the distance information, the time information, the location information, and the brightness information, which are included in the incidental information 162. For example, if the distance information indicates that the distance from the image capturing apparatus to the subject is long, the correction value determination unit 110 assumes that it is an image of a landscape, and the gamma correction value determination unit 116 determines to raise the gamma correction value.

Figure 6:
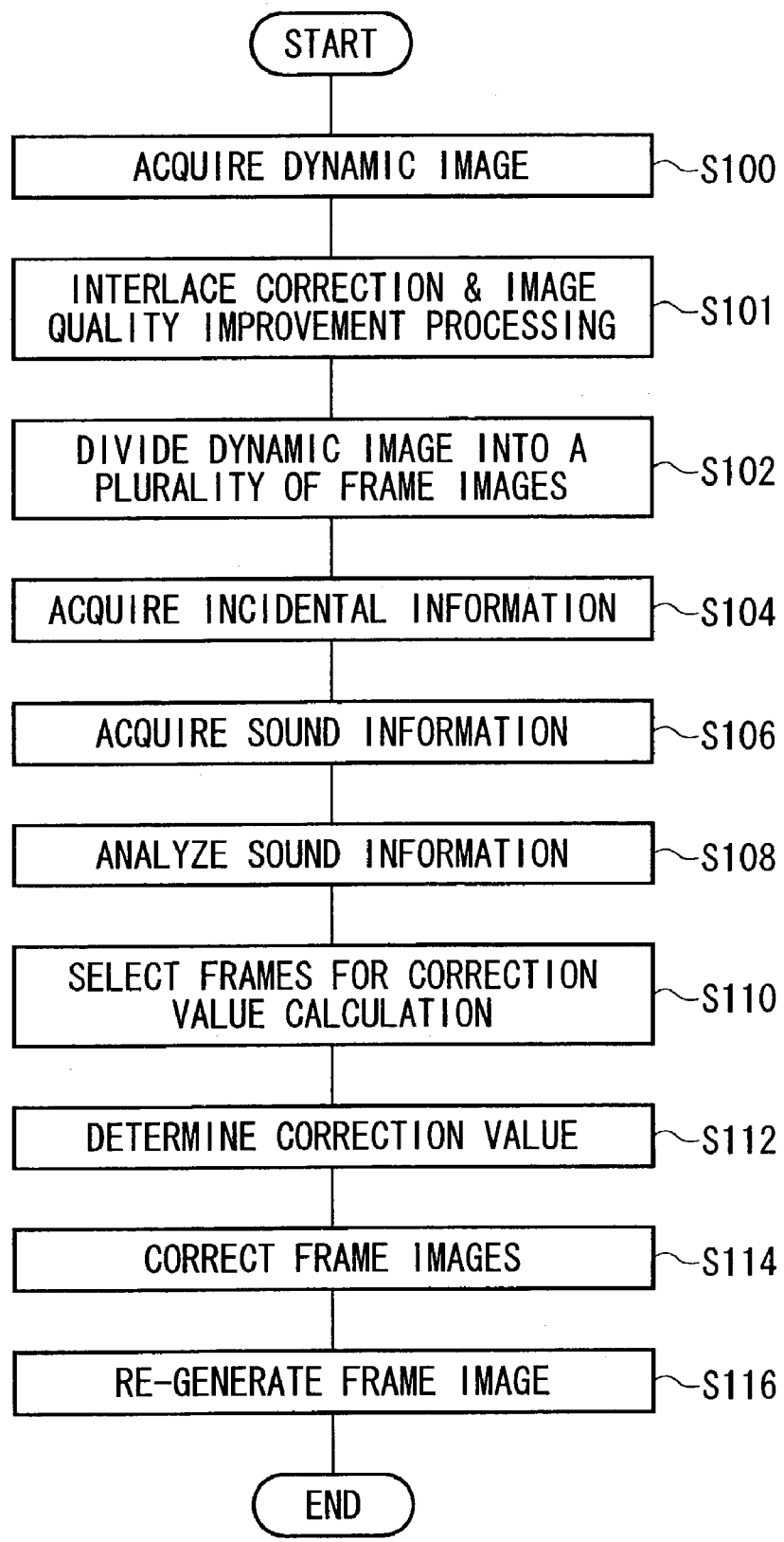
FIG. 6 is a flow chart exemplary showing operation of the image processing apparatus according to the present embodiment.

FIG. 6 is a flow chart exemplary showing an operation of the image processing apparatus 10 according to the present embodiment. First, the dynamic image acquisition unit 102 acquires a dynamic image including a plurality of frame images (S100). Next, the image processing unit 107 performs the interlace correction and the image quality improvement processing on the dynamic image acquired by the dynamic image acquisition unit 102 (S101). Next, the frame image producing unit 108 divides the dynamic image, on which the image processing unit 107 has performed the interlace correction and the image quality improvement processing, into a plurality of frame images (S102). Then the incidental information acquisition unit 160 acquires the incidental information which accompanies the frame image produced by the frame image producing unit 108 (S104).

Next, the sound information acquisition unit 100 acquires the sound information included in the dynamic image (S106). Next, the sound information analysis unit 106 analyzes the sound source of the sound information (S108). Specifically, the sound information analysis unit 106 extracts voice information and correction information corresponding to the voice information from the sound information.

Next, the detection unit 120 analyzes the frame images, which is produced by the frame image producing unit 108 from the dynamic image, and detects the change of the scenes of the dynamic image (S110). Specifically, if difference in at least one of the color signals, which defines color of a frame image, between two adjacent frame images is larger than a predetermined value, the detection unit 120 judges that the scenes are changed between the two frame images. Other than CMY data, the color signals may be RGB data, CIE color system which is obtainable by converting the RGB data, or LAB color system consisting of lightness (L*), color saturation (Cab*), and hue (Hab*).

Next, the correction value determination unit 110 determines the correction value based on the incidental information acquired by the incidental information acquisition unit 160, the frame images produced by the frame image producing unit 108, the change of the scenes detected by the detection unit 120, and the voice information extracted by the sound information analysis unit 106 from the sound information, and the correction information corresponding to the voice information (S112).

Next, the correction unit 130 corrects the frame images based on the correction values determined by the correction value determination unit 110 (S114). Next, the re-generation unit 140 combines the frame images corrected by the correction unit 130, and re-generates the dynamic image (S116).

Figure 7:
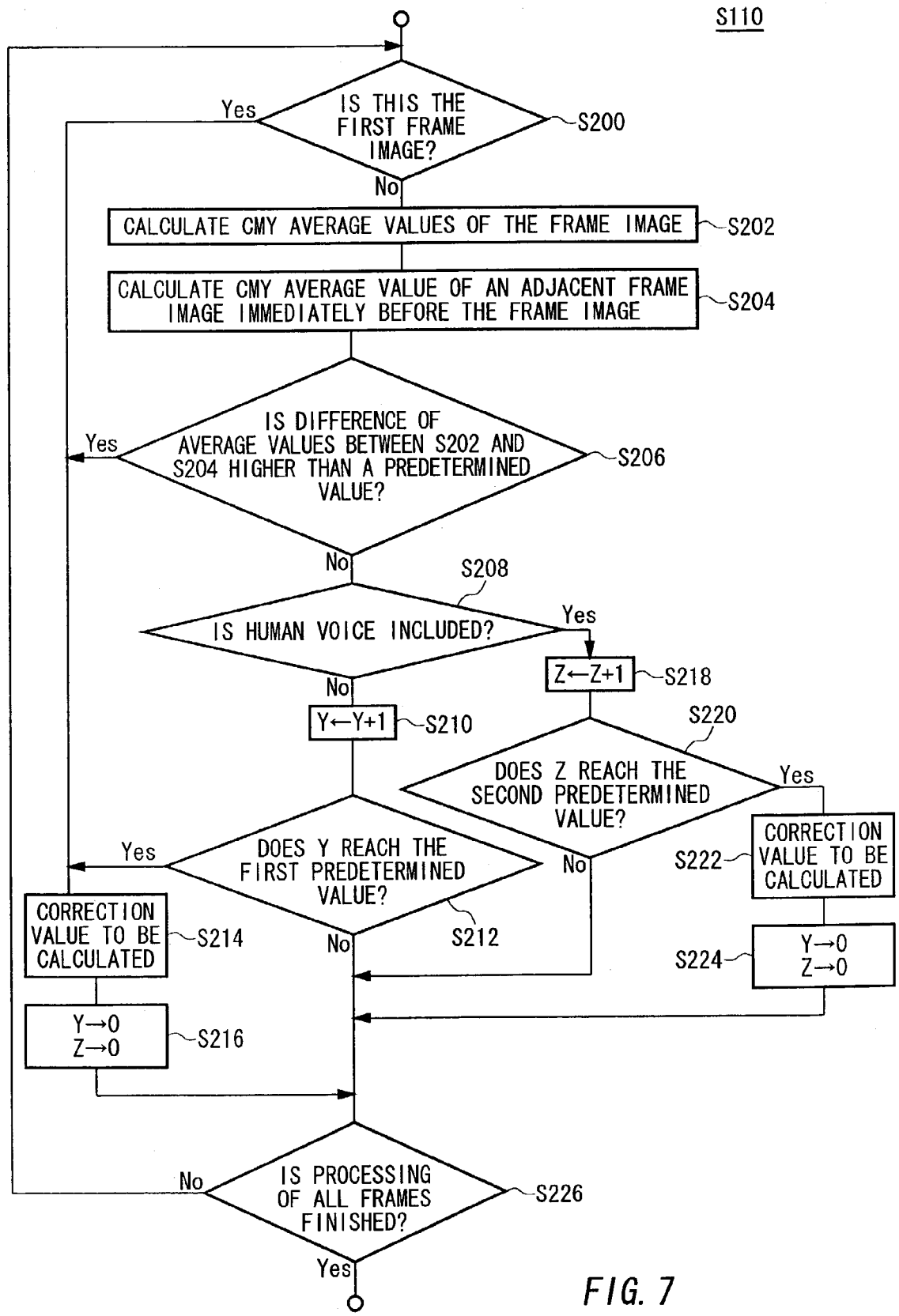
FIG. 7 is a flow chart exemplary showing detailed operation of S110 in FIG. 6 of the image processing apparatus.

FIG. 7 is a flow chart exemplary showing detailed operation of S110 in FIG. 6 of the image processing apparatus 10. First, the detection unit 120 judges whether a frame image, which is produced by the frame image producing unit 108, is the first frame image of the dynamic image (S200). When the detection unit 120 judges that the frame image, which is produced by the frame image producing unit 108, is not the first frame image of the dynamic image, it calculates average values of C (cyan), M (magenta), and Y (yellow) of the frame image respectively (S202). Next, the detection unit 120 calculates average values of C, M and Y of an adjacent frame image immediately before the frame image respectively (S204).

Next, The detection unit 120 calculates difference between the average values of C, M, and Y calculated in the step S202 and the average value of C, M and Y calculated in the step S204 respectively. If the difference of each of the average values of C, M, and Y are lower than a predetermined value, the detection unit 120 proceeds to step S208. On the other hand, if the difference of each of the average values of C, M, or Y is higher than a predetermined value, the detection unit 120 judges that the scenes are changed between the two frame images and proceeds to step S214 (S206). If at least one of these following inequalities is satisfied, the detection unit 120 judges that the scenes are changed between the two frame images.

$\Delta C = C_x - C_{x-1} > C_t$ $\Delta M = M_x - M_{x-1} > M_t$ $\Delta Y = Y_x - Y_{x-1} > Y_t$ Where, $C_x$, $M_x$ and $Y_x$ are the average of C, M and Y in the frame image, and $C_{x-1}$, $M_{x-1}$ and $Y_{x-1}$ are the average of C, M, and Y in an adjacent frame image immediately before the frame image.

Although the detection unit 120 according to the present embodiment detects the change of the scenes by the averages of C, M, and Y, when the frame image is described by RGB color system, the change of the scenes may be detected by the averages of R, G and B.

Next, the correction value determination unit 110 judges whether human voice is included in the sound information corresponding to the frame image (S208). If it is judged that human voice is included in the sound information corresponding to a frame image, the correction value determination unit 110 adds 1 to Variable Z (initial value Z=0) (S218). Next, if Z reaches a second predetermined value (S220), the correction value determination unit 110 judges that the correction value is to be calculated for the frame image (S222). Next, initial value 0 is assigned to each of Y and Z (S224). On the other hand, if Z is smaller than the second predetermined value in step S220, operation of the step S110 described in FIG. 6 is halted.

On the other hand, if it is judged that human voice is not included in the sound information corresponding to a frame image, the correction value determination unit 110 adds 1 to Variable Y (initial value Y=0) (S210). Next, if Y reaches a first predetermined value (S212), which is larger than the second predetermined value, the correction value determination unit 110 judges that the correction value is to be calculated in the frame image (S214). Next, initial value 0 is assigned to each of Y and Z (S216). The image processing apparatus 10 repeats the operation from S200 to S224 until the processing of all the frame images included in the dynamic image is finished (S226).

Moreover, if the detection unit 120 judges that the frame image produced by the frame image producing unit 108 is the first frame image in the dynamic image in the step S200, it proceeds to step S214.

In this way, the image processing apparatus 10 detects the change of the scenes. Generally, the correction value used for the image processing changes substantially at the change of the scenes. Therefore, the image processing apparatus 10 selects the frame images between which the correction values are likely to change substantially by detecting the change of the scenes.

Alternatively, the image processing apparatus 10 samples frame images every predetermined interval and determines the correction value. Thereby, the image processing apparatus 10 simplifies the operation as compared with the case where the correction values of all the frame images are calculated. Although the image processing apparatus 10 samples frame images every predetermined number of frames for the calculation of the correction value in this embodiment, it may sample the frame images every predetermined number of seconds according to another embodiment.

Alternatively, the image processing apparatus 10 selects the frame image corresponding to the sound information in which human voice is included. Furthermore, the image processing apparatus 10 performs different processing between the dynamic image corresponding to the sound information in which human voice is included, and the dynamic image corresponding to the sound information in which human voice is not included. Specifically, if the sound information, in which human voice is included, corresponds to the dynamic image, the image processing apparatus 10 samples the frame image for calculating the correction value every narrower interval as compared with the dynamic image corresponding to the sound information in which human voice is not included. Generally, if human voice is included in the sound information, it is presumed that a subject of the corresponding dynamic image is a human. Therefore, the image processing apparatus 10 performs accurate correction by calculating the correction value of the dynamic image in which a human may be included more frequently.

Figure 8:
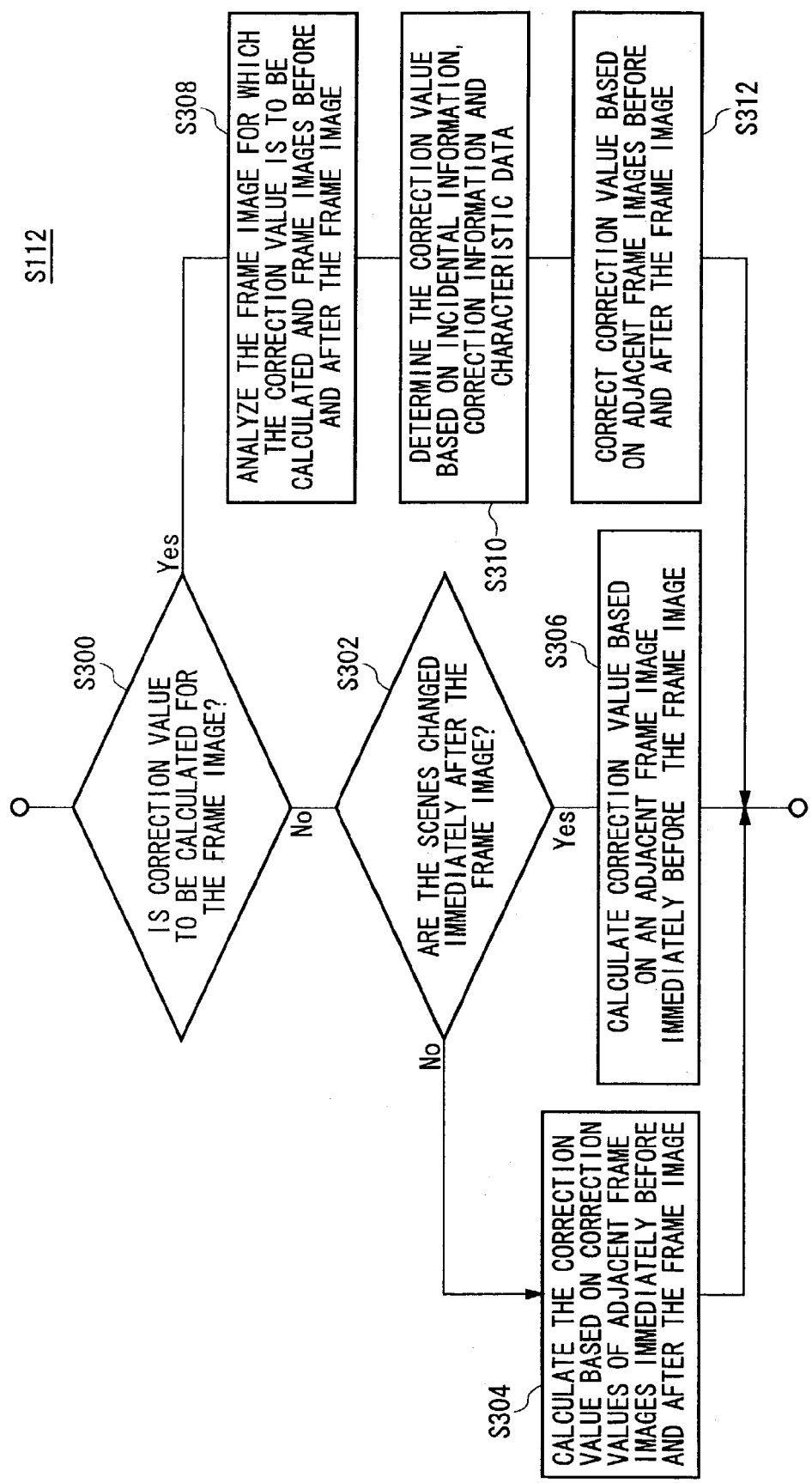
FIG. 8 is a flow chart exemplary showing detailed operation of S112 in FIG. 6 of the image processing apparatus.

FIG. 8 is a flow chart exemplary showing detailed operation of S112 in FIG. 6 of the image processing apparatus 10. First, the correction value determination unit 110 judges whether a correction value is to be calculated for a frame image (S300). Next, if it is judged that the correction value is to be calculated for the frame image, the correction value determination unit 110 analyzes a plurality of frame images including the frame image for which the correction value is to be calculated (S308). The correction value determination unit 110 calculates the data indicating characteristic of images, such as whole part of the plurality of frame images, the average CMY value of each of the frame images, and a proportion of area including a specific density region (to be referred to as "characteristic data"), for adjacent frame images before and after the frame image for which the correction value is to be calculated, and for the frame image for which the correction value is to be calculated.

Next, in addition to the incidental information and the correction information, the correction value determination unit 110 determines the correction value based on the calculated characteristic data (S310).

Next, the correction value determination unit 110 corrects the calculated correction value of a frame image using the correction values of adjacent frame images before and after the frame image (S312). For example, the correction value determination unit 110 corrects the correction value from $A_x$ to $A_x'$ by following equation.

$$A_x' = (A_{x-1} + 2A_x + A_{x+1})/4$$

Where $A_x$ is a correction value of the frame image, $A_{x-1}$ is a correction value of an adjacent frame image before the frame image, and $A_{x+1}$ is a correction value of an adjacent frame image after the frame image.

On the other hand, if it is judged that it is not the frame image for which the correction value is to be calculated, the correction value determination unit 110 judges whether the scenes are changed immediately after the frame image (S302). Next, if the correction value determination unit 110 judges that the scenes are changed immediately after the frame image, the correction value of the frame image is calculated using the correction value of an adjacent frame image immediately before the frame image (S306).

If it is judged in the step S302 that the scenes are not changed immediately after the frame image, the correction value determination unit 110 calculates the correction value of the frame image using the correction values of adjacent frame images immediately before and after the frame image (S304). Alternatively, if it is judged that not only the scenes are not changed immediately after the frame image but also there is no change of scenes during a certain number of image frames after the image frame, the correction value of the frame image is calculated using the correction values of adjacent frame images immediately before and after the frame image.

In this way, the image processing apparatus 10 calculates the correction value of the frame image using the correction value of adjacent frame images immediately before and after the frame image. Moreover, the image processing apparatus 10 calculates the correction value of the frame image using the correction value of an adjacent frame image immediately before the frame image if the scenes are changed immediately after the frame image.

Figure 9:
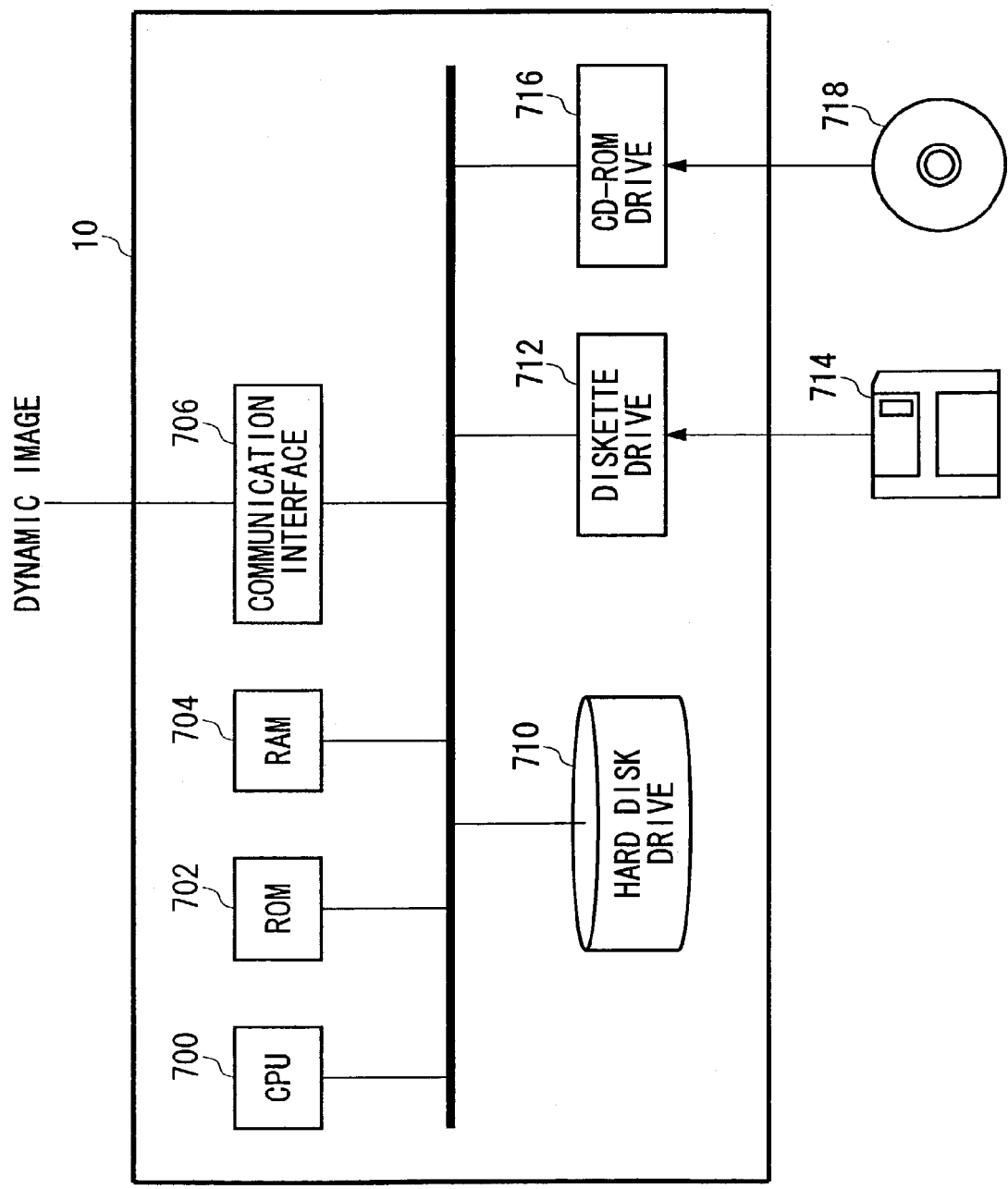
FIG. 9 is a block diagram showing a hardware configuration of the image processing apparatus.

FIG. 9 is a block diagram exemplary showing a hardware configuration of the image processing apparatus 10. The image processing apparatus 10 includes CPU 700, ROM 702, RAM 704 and a communication interface 706. The CPU 700 operates based on a program stored in the ROM 702 and the RAM 704. A hard disk drive 710 as an example of a storing device stores setting information and the program which the CPU 700 executes.

A diskette drive 712 reads data or a program in a diskette 720, and provides them to the CPU 700. A CD-ROM drive 714 reads data or a program in a CD-ROM 722, and provides them to the CPU 700. The communication interface 706 transmits and receives the dynamic image data.

The program executed by the CPU 700 is provided by a user, being stored in a record medium such as the diskette 720 or the CD-ROM 722. The program stored in the record medium may be either compressed or decompressed. The program is read from the record medium, installed in the hard disk drive 710, read by the RAM 704 and executed by the CPU 700.

The program which is provided in the record medium, i.e., the program installed in the hard disk drive 710, includes a sound information acquisition module, a dynamic image acquisition module, an incidental information acquisition module, a sound information analysis module, a frame image producing module, a correction value determination module, a re-generation module, a detection module, and a correction module as functional configurations. Explanation of the operation of these units is omitted since the processing, which is executed by the CPU 700 with each of these modules, is the same as the function and operation of the corresponding elements in the image processing apparatus 10 according to the present embodiment.

A part or all of functions of operation of the image processing apparatus 10 in all the embodiments explained in the present patent application are storable in the diskette 714 or the CD-ROM 718, as examples of a record medium shown in FIG. 9.

The program may be read from the record medium by the RAM directly and executed, or the program may be installed in the hard disk drive once and then be read by the RAM and executed. Furthermore, the program may be stored in a single record medium or a plurality of record media. The program stored in the record medium may provide each function in cooperation with an operating system. For example, the program may request the operating system to do some or all functions, or the function may be provided based on the response from the operating system.

The program or the module described above may be stored in an external record medium. It is possible to use an optical record medium such as DVD or PD, a magneto-optical record medium such as Minidisk, a tape medium, a magnetic record medium or a semiconductor memory such as an IC card or a Miniature Card as a record medium instead of the diskette or the CD-ROM. A storage device, such as a hard disk or RAM in a server system on a dedicated communication network or the Internet, may be used as a record medium, and the program may be provided to the image processing apparatus 10 through the communication medium.

Although the present invention has been described by way of an exemplary embodiment, it should be understood that those skilled in the art might make many changes and substitutions without departing from the spirit and the scope of the present invention.

For example, while the image processing apparatus 10 according to the present embodiment judges the change of the scenes using chromatility in the frame image, in another embodiment, the image processing apparatus 10 judges that there is the change of the scenes when the difference of the distance from the subject to the image capturing apparatus or interval of photography date/time between two frame images is larger than a predetermined value. In this case, the incidental information acquisition unit 160 of the image processing apparatus 10 acquires the distance information or the time information as the incidental information, and transmits the acquired distance information or the time information to the detection unit 120. The detection unit 120 judges whether there is the change of the scenes based on the received distance information or the time information.

It is obvious from the definition of the appended claims that embodiments with such modifications also belong to the scope of the present invention.

As described above, according to the present invention, the appropriate correction value for each of the frame images of the dynamic image can be determined.

What is claimed is:

1. An image processing apparatus for performing correction processing on a dynamic image including a plurality of frame images, comprising:
   a sound information acciuisition unit acquiring sound information of the dynamic image with synchronous information that synchronizes the sound information with a corresponding frame image:
   a sound database storing sound data of a plurality of sound sources;
   a sound information analysis unit analyzing the sound information and extracting correction information corresponding to the same/similar sound data as/to the sound data of a sound source from the sound database when the sound information includes the same/similar sound source as/to the sound source of the sound data stored in the sound database;
   a correction value determination unit determining a correction value for image processing on each of the frame images based on the correction information extracted by the sound information analysis unit; and
   a correction unit correcting each of the frame images of the dynamic image based on the correction value determined by said correction value determination unit.

2. The image processing apparatus as claimed in claim 1, wherein
   said correction value determination unit determines correction value for each of the plurality of frame images respectively, and
   said correction unit corrects each of the frame images based on the correction values determined by said correction value determination unit.

3. The image processing apparatus as claimed in claim 2, wherein
   said correction value determination unit determines the correction values of frame images every predetermined number of frames among the plurality of frame images, and
   said correction unit corrects each of the frame images based on the correction values determined by said correction value determination unit.

4. The image processing apparatus as claimed in claim 2, wherein said correction value determination unit determines the correction values of frame images every predetermined interval among the plurality of frame images, and determines the correction values of frame images, which are sandwiched between the two frame images on which the correction values are determined by said correction value determination unit, based on the correction value of the two frame images.

5. The image processing apparatus as claimed in claim 4, wherein said correction value determination unit determines the correction values of frame images every predetermined number of seconds among the plurality of frame images, and determines the correction values of frame images, which are sandwiched between the two frame images on which the correction values are determined by said correction value determination unit, based on the correction value of the two frame images.

6. The image processing apparatus as claimed in claim 4, wherein said correction value determination unit determines the correction values of frame images every predetermined number of frames among the plurality of frame images, and determines the correction values of frame images, which are sandwiched between the two frame images on which the correction values are determined by said correction value determination unit, based on the correction value of the two frame images.

7. The image processing apparatus as claimed in claim 4, wherein said correction value determination unit determines the correction values of frame images which are sandwiched between the two frame images on which the correction values are determined by said correction value determination unit, by interpolating between the two frame images.

8. The image processing apparatus as claimed in claim 4, further comprising
   a detection unit detecting change of scenes of the dynamic image, and wherein
   said correction value determination unit determines the correction value of a frame image immediately after the change of the scenes and another frame image after a predetermined interval from the frame image, and determines the correction values of frame images, which are sandwiched between the two frame images on which the correction values are determined by said correction value determination unit, based on the correction value of the two frame images.

9. The image processing apparatus as claimed in claim 2 further comprising
   a detection unit detecting change of scenes of the dynamic image, and wherein
   said correction value determination unit determines a correction value for each of the scenes based on the change of the scenes detected by said detection unit.

10. The image processing apparatus as claimed in claim 9, wherein
    if difference of a first color component, a second color component or a third color component between the frame image and another frame image immediately before the frame image is larger than a predetermined value, said detection unit judges that the scenes are changed between the two frame images.

11. The image processing apparatus as claimed in claim 10, wherein said color components are a C (cyan) component, an M (magenta) component, and a Y (yellow) component.

12. The image processing apparatus as claimed in claim 10, wherein said color components are hue, color saturation, and lightness.

13. The image processing apparatus as claimed in claim 10, wherein said color components are an R (red) component, a G (green) component, and a B (blue) component.

14. The image processing apparatus as claimed in claim 9, wherein
    the dynamic image is an image of a subject captured by the image capturing apparatus, and
    if the difference of distance from the subject of the frame image to the image capturing apparatus between the frame image and a frame image immediately before the frame image is larger than a predetermined value, said detection unit judges that the scenes are changed between the two frame images.

15. The image processing apparatus as claimed in claim 1, further comprising
    an incidental information acquisition unit acquiring incidental information about each of the frame images, and wherein said correction value determination unit determines the correction value based on the incidental information acquired by said incidental information acquisition unit.

16. The image processing apparatus as claimed in claim 15, wherein said incidental information acquisition unit acquires photography time of each of the frame images as the incidental information.

17. The image processing apparatus as claimed in claim 15, wherein said incidental information acquisition unit acquires photography location of each of the frame images as the incidental information.

18. The image processing apparatus as claimed in claim 15, wherein the dynamic image is an image of a subject captured by the image capturing apparatus, and said incidental information acquisition unit acquires information indicating distance from the subject of each of the frame images to the image capturing apparatus as the incidental information.

19. The image processing apparatus as claimed in claim 15, wherein the dynamic image is an image of a subject captured by the image capturing apparatus, and said incidental information acquisition unit acquires information indicating brightness of each of the frame images as the incidental information.

20. The image processing apparatus as claimed in claim 1, wherein
the dynamic image further includes sound information, and the image processing apparatus further comprises:
a sound information acquisition unit acquiring the sound information; and
a sound information analysis unit analyzing sound source of the sound information, and
said correction value determination unit determines the correction value based on the information indicating the sound source analyzed by said sound information analysis unit.

21. The image processing apparatus as claimed in claim 1, wherein
said correction value determination unit determines the correction value for white balance correction of each of the frame images, and
said correction unit performs white balance correction on each of the frame images of the dynamic image based on the correction value.

22. The image processing apparatus as claimed in claim 1, wherein
said correction value determination unit determines the correction value for gamma correction of each of the frame images, and
said correction unit performs gamma correction on each of the frame images of the dynamic image based on the correction value.

23. The image processing apparatus as claimed in claim 1, wherein
said correction value determination unit determines the correction value for brightness correction of each of the frame images, and
said correction unit performs brightness correction on each of the frame images of the dynamic image based on the correction value.

24. The image processing apparatus as claimed in claim 1, wherein
said correction value determination unit determines the correction value for edge enhancement correction for each of the frame images, and
said correction unit performs edge enhancement correction on each of the frame images of the dynamic image based on the correction value.

25. A computer program product comprising a readable medium having stored thereon a computer readable program executable by a computer for performing correction processing on a dynamic image including a plurality of frame images, the computer readable program comprising:
a sound information acquisition module directing the computer to acquire sound information of the dynamic image with synchronous information that synchronizes the sound information with a corresponding frame image:
a sound information analysis module directing the computer to analyze the sound information and to extract correction information corresponding to the same/similar sound data as/to sound data of a sound source stored in a sound database, which stores sound data of a plurality of sound sources, when the sound information includes the same/similar sound source as/to the sound source of the sound data stored in the sound database;
a correction value determination module causing the computer to determine a correction value for image processing on each of the frame images based on the extracted correction information; and
a correction module causing computer to correct each of the frame images of the dynamic image based on the determined correction value.

26. The computer program product as claimed in claim 25, wherein
said correction value determination module causes computer to determine correction value for each of the plurality of frame images respectively, and
said correction module causes computer to correct each of the frame images based on the correction values caused to determine by said correction value determination module.

27. The computer program product as claimed in claim 26, wherein
said correction value determination module causes computer to determine the correction values of frame images every predetermined number of frames among the plurality of frame images, and
said correction module causes computer to correct each of the frame images based on the correction values caused to determine by said correction value determination module.

28. The computer program product as claimed in claim 26, wherein said correction value determination module causes computer to determine the correction values of frame images every predetermined interval among the plurality of frame images, and causes computer to determine the correction values of frame images, which are sandwiched between the two frame images on which the correction values are caused to determine by said correction value determination module, based on the correction value of the two frame images.

29. The computer program product as claimed in claim 28, wherein said correction value determination module causes computer to determine the correction values of frame images every predetermined number of seconds among the plurality of frame images, and causes computer to determine the correction values of frame images, which are sandwiched between the two frame images on which the correction values are caused to determine by said correction value determination module, based on the correction value of the two frame images.

30. The computer program product as claimed in claim 28, wherein said correction value determination module causes computer to determine the correction values of frame images every predetermined number of frames among the plurality of frame images, and causes computer to determine the correction values of frame images, which are sandwiched between the two frame images on which the correction values are caused to determine by said correction value determination module, based on the correction value of the two frame images.

31. The computer program product as claimed in claim 28, wherein said correction value determination module causes computer to determine the correction values of frame images which are sandwiched between the two frame images on which the correction values are caused to determine by said correction value determination module, by interpolating between the two frame images.

32. The computer program product as claimed in claim 28, further comprising
a detection module causing computer to detect change of scenes of the dynamic image, and wherein
said correction value determination module causes computer to determine the correction value of a frame image immediately after the change of the scenes and another frame image after a predetermined interval from the frame image, and causes computer to determine the correction values of frame images, which are sandwiched between the two frame images on which the correction values are caused to determine by said correction value determination module, based on the correction value of the two frame images.

33. The computer program product as claimed in claim 26 further comprising
a detection module causing computer to detect change of scenes of the dynamic image, and wherein
said correction value determination module causes computer to determine a correction value for each of the scenes based on the change of the scenes caused to detect by said detection module.

34. The computer program product as claimed in claim 33, wherein
if difference of a first color component, a second color component or a third color component between the frame image and another frame image immediately before the frame image is larger than a predetermined value, said detection module causes computer to judge that the scenes are changed between the two frame images.

35. The computer program product as claimed in claim 34, wherein said color components are a C (cyan) component, an M (magenta) component, and a Y (yellow) component.

36. The computer program product as claimed in claim 34, wherein said color components are hue, color saturation, and lightness.

37. The computer program product as claimed in claim 34, wherein said color components are an R (red) component, a G (green) component, and a B (blue) component.

38. The computer program product as claimed in claim 33, wherein
the dynamic image is an image of a subject captured by an image capturing apparatus, and
if the difference of distance from the subject of the frame image to the image capturing apparatus between the frame image and a frame image immediately before the frame image is larger than a predetermined value, said detection module causes computer to judge that the scenes are changed between the two frame images.

39. The computer program product as claimed in claim 25, further comprising
an incidental information acquisition module causing computer to acquire incidental information about each of the frame images, and wherein
said correction value determination module causes computer to determine the correction value based on the incidental information caused to acquire by said incidental information acquisition module.

40. The computer program product as claimed in claim 39, wherein said incidental information acquisition module causes computer to acquire photography time of each of the frame images as the incidental information.

41. The computer program product as claimed in claim 39, wherein said incidental information acquisition module causes computer to acquire photography location of each of the frame images as the incidental information.

42. The computer program product as claimed in claim 39, wherein the dynamic image is an image of a subject captured by the image capturing apparatus, and said incidental information acquisition module causes computer to acquire information indicating distance from the subject of each of the frame images to the image capturing apparatus as the incidental information.

43. The computer program product as claimed in claim 39, wherein the dynamic image is an image of a subject captured by the image capturing apparatus, and said incidental information acquisition module causes computer to acquire information indicating brightness of each of the frame images as the incidental information.

44. The computer program product as claimed in claim 25, wherein
the dynamic image further includes sound information, and the computer readable medium storing thereon a program further comprises:
a sound information acquisition module causing computer to acquire the sound information; and
a sound information analysis module causing computer to analyze sound source of the sound information, and
said correction value determination module causes computer to determine the correction value based on the information indicating the sound source caused to analyze by said sound information analysis module.

45. The computer program product as claimed in claim 25, wherein
said correction value determination module causes computer to determine the correction value for white balance correction of each of the frame images, and
said correction module causes computer to perform white balance correction on each of the frame images of the dynamic image based on the correction value.

46. The computer program product as claimed in claim 25, wherein
said correction value determination module causes computer to determine the correction value for gamma correction of each of the frame images, and
said correction module causes computer to perform gamma correction on each of the frame images of the dynamic image based on the correction value.

47. The computer program product as claimed in claim 25, wherein
said correction value determination module causes computer to determine the correction value for brightness correction of each of the frame images, and said correction module causes computer to perform brightness correction on each of the frame images of the dynamic image based on the correction value.

48. The computer program product as claimed in claim 25, wherein said correction value determination module causes computer to determine the correction value for edge enhancement correction for each of the frame images, and said correction module causes computer to perform edge enhancement correction on each of the frame images of the dynamic image based on the correction value.

49. An image processing method for performing correction processing on a dynamic image including a plurality of frame images, comprising steps of:

acquiring sound information of the dynamic image with synchronous information that synchronizes the sound information with a corresponding frame image:

analyzing the sound information and extracting correction information corresponding to the same/similar sound data as/to sound data of a sound source stored in a sound database, which stores sound data of a plurality of sound sources, when the sound information includes the same/similar sound source as/to the sound source of the sound data stored in the sound database;

determining a correction value for image processing on each of the frame images; and correcting each of the frame images of the dynamic image based on the determined correction value.

50. A method for producing a dynamic image including a plurality of frame images, comprising steps of:

acquiring a dynamic image;

acquiring sound information of the dynamic image with synchronous information that synchronizes the sound information with a corresponding frame image;

analyzing the sound information and extracting correction information corresponding to the same/similar sound data as/to sound data of a sound source stored in a sound database, which stores sound data of a plurality of sound sources, when the sound information includes the same/similar sound source as/to the sound source of the sound data stored in the sound database;

determining a correction value of each of the frame images included in the acquired dynamic image; and correcting each of the frame images included in the dynamic image based on the determined correction value.

51. A printer apparatus for printing a frame image included in a dynamic image having a plurality of frame images, comprising:

an image acquisition unit acquiring a corresponding frame image to be printed;

a sound information acquisition unit acquiring sound information of the dynamic image with synchronous information that synchronizes the sound information with the corresponding frame image, a sound database storing sound data of a plurality of sound sources;

a sound information analysis unit analyzing the sound information and extracting correction information corresponding to the same/similar sound data as/to the sound data of a sound source from the sound database when the sound information includes the same/similar sound source as/to the sound source of the sound data stored in the sound database;

a correction value calculating unit calculating a correction value used for image processing on each of the frame images based on the correction information extracted by the sound information analysis unit; and a correction unit correcting the corresponding frame image to be printed based on the correction value calculated by said correction value calculating unit.

* * * * *